US010127328B2

(12) United States Patent
Mineki et al.

(10) Patent No.: US 10,127,328 B2
(45) Date of Patent: Nov. 13, 2018

(54) DISTRIBUTION DEVICE FOR WEB CONTENT

(71) Applicant: KDDI Corporation, Tokyo (JP)

(72) Inventors: Gen Mineki, Saitama (JP); Satoshi Uemura, Saitama (JP); Takayuki Goto, Saitama (JP)

(73) Assignee: KDDI CORPORATION, Tokyo (JP)

( * ) Notice: Subject to any disclaimer, the term of this patent is extended or adjusted under 35 U.S.C. 154(b) by 232 days.

(21) Appl. No.: 14/411,609

(22) PCT Filed: May 2, 2013

(86) PCT No.: PCT/JP2013/062758
§ 371 (c)(1),
(2) Date: Dec. 29, 2014

(87) PCT Pub. No.: WO2014/002612
PCT Pub. Date: Jan. 3, 2014

(65) Prior Publication Data

US 2015/0161284 A1 Jun. 11, 2015

(30) Foreign Application Priority Data

Jun. 29, 2012 (JP) ................................ 2012-146859

(51) Int. Cl.
*G06F 15/167* (2006.01)
*G06F 17/30* (2006.01)
(Continued)

(52) U.S. Cl.
CPC .... *G06F 17/30902* (2013.01); *H04L 67/2842* (2013.01); *H04N 21/4126* (2013.01);
(Continued)

(58) Field of Classification Search
CPC .......... G06F 17/30902; H04L 67/2842; H04N 21/4126; H04N 21/4381; H04N 21/4384; H04N 21/6125; H04N 21/44016
(Continued)

(56) References Cited

U.S. PATENT DOCUMENTS 7,565,423 B1 * 7/2009 Fredricksen ...... H04L 29/12066 709/203
8,756,296 B2 6/2014 Wang et al.
(Continued)

FOREIGN PATENT DOCUMENTS

CN 101051980 A 10/2007
CN 101242422 A 8/2008
(Continued)

OTHER PUBLICATIONS

International Search Report and Written Opinion (English translation of Search Report only) for PCT/JP2013/062758, dated Aug. 6, 2013, 11 pages.

(Continued)

*Primary Examiner* — Philip B Tran
(74) *Attorney, Agent, or Firm* — Westman, Champlin & Koehler, P.A.

(57) ABSTRACT

The present invention provides a distribution device for web content capable of quickly distributing a multi-domain web page in response to a request from a client. A unit 1 acquires from a web server an html file A and related sub content B, C, D for a web page requested from a client, and then caches the html file A and related sub content B, C, D in a unit 2. A unit 3 edits each piece of content data B, C, D so that the client can obtain the html file A and each piece of content for the web page from the same domain. A unit 701 reads out the html file A that was cached in the unit 2 and distributes the
(Continued)

html file A to the client. A unit 703 push-distributes each piece of content data B, C, D to the client.

5 Claims, 5 Drawing Sheets

(51) Int. Cl.
*H04N 21/41* (2011.01)
*H04N 21/438* (2011.01)
*H04N 21/44* (2011.01)
*H04N 21/61* (2011.01)
*H04L 29/08* (2006.01)

(52) U.S. Cl.
CPC ..... *H04N 21/4381* (2013.01); *H04N 21/4384* (2013.01); *H04N 21/44016* (2013.01); *H04N 21/6125* (2013.01)

(58) Field of Classification Search
USPC ................................ 709/213, 217, 219, 227
See application file for complete search history.

(56) References Cited

U.S. PATENT DOCUMENTS

| | | | | |
|---|---|---|---|---|
| 8,812,651 | B1 * | 8/2014 | Eriksen | H04L 45/745 709/224 |
| 9,407,699 | B2 | 8/2016 | Sivasubramanian et al. | |
| 2004/0205149 | A1 * | 10/2004 | Dillon | G06F 17/30902 709/217 |
| 2005/0198309 | A1 * | 9/2005 | Li | H04L 67/2847 709/227 |
| 2007/0250601 | A1 * | 10/2007 | Amlekar | G06F 17/30902 709/219 |
| 2008/0208789 | A1 * | 8/2008 | Almog | G06N 99/005 706/54 |
| 2010/0088761 | A1 * | 4/2010 | Podjarny | G06F 21/00 726/22 |
| 2011/0137973 | A1 * | 6/2011 | Wei | H04L 67/1008 709/202 |
| 2012/0096106 | A1 * | 4/2012 | Blumofe | G06Q 50/00 709/213 |

FOREIGN PATENT DOCUMENTS

| | | | |
|---|---|---|---|
| CN | 102047242 | A | 5/2011 |
| JP | 2001-265641 | A | 9/2001 |
| JP | 2009-217836 | A | 9/2009 |
| JP | 2010-102509 | A | 5/2010 |

OTHER PUBLICATIONS

Fielding, R. et al., "Hypertext Transfer Protocol—HTTP/1.1", RFC2616, Jun. 1999, Network Working Group, 176 pages.

Belshe, M. et al., "SPDY Protocol", InternetDraft mbelshe-spdy-00, Feb. 2012, Network Working Group, 51 pages.

Nygren, Erik et al., "The Akamai Network: A Platform for High-Performance Internet Applications", Akamai Technologies, Cambridge, MA, Dept. of Computer Science, University of Mass, ACM SIGOPS Operating Systems Review, vol. 44, No. 2, Jul. 2010, 18 pages.

International Preliminary Report on Patentability (including PCT/IB/326 and PCT/IB/338) for PCT Application No. PCT/JP2013/062758, dated Dec. 31, 2014, 7 pages.

Office Action, including Search Report, for Chinese Patent Application No. 201380033272.5, dated Jan. 6, 2017, 14 pages.

Hui, Lin Zong, "Parsing of process of loading and rendering a webpage by a browser", http://blog.163.com/seo_luofeng/blog/static/176575024201242412342680/2012/5/24 pp. 1-6, May 24, 2012, 11 pages.

* cited by examiner

DISTRIBUTION DEVICE FOR WEB CONTENT

CROSS-REFERENCE TO RELATED APPLICATION

This Application is a Section 371 National Stage Application of International Application No. PCT/JP2013/062758, filed 2 May 2013 and published as WO 2014/002612 A1 on 3 Jan. 2014, in Japanese, the contents of which are hereby incorporated by reference in their entirety.

TECHNICAL FIELD

The present invention relates to a distribution device for a web content, and more particularly, to a distribution device that is appropriate for distribution of a web page having a multi-domain configuration in which content data configuring the web page is arranged in a plurality of web servers in a distributed manner together with an html file thereof.

BACKGROUND ART

Technologies for increasing the speed of distribution of a web content are disclosed in Non-Patent Documents 1, 2, and 3. In Non-Patent Document 1, a technology for distributing a plurality of web contents on a TCP connection that is established once by a server maintaining the TCP connection with a client for a predetermined period is disclosed. In this way, since there is no need for establishing and cutting off a TCP connection for each content data, high-speed distribution of a web content is realized.

In Non-Patent Document 2, SPDY that improves the distribution speed of a web content in an existing HTTP by configuring integration of TCP connections, push distribution from a server, multiplexed transmission of a request, deletion of a redundant header, and compression of communication data to be essential is disclosed. At this time, by embedding the SPDY in a session layer operating the HTTP, high-speed distribution of a web content is realized without reconfiguring an existing TCP, SSL, or HTTP.

In Non-Patent Document 3, a technology for arranging a reverse proxy called as an edge server on a network, maintaining content data necessary for distribution of a web content or the like as a cache, and communicating with a client using the edge server instead of a server maintaining original content data is disclosed. In this way, an RTT is shortened to be less than that of a case where communication is performed between the original server and the client, and, accordingly, high-speed distribution of a web content is realized.

CITATION LIST

Non-Patent Literature

Non Patent Literature 1 R. Fielding, J. Gettys, J. Mogul, H. Frystyk, L. Masinter, P. Leach, T. Berners-Lee, “Hypertext Transfer Protocol—HTTP/1.1”, RFC2616, June 1999.

Non Patent Literature 2 M. Belshe, R. Peon, “SPDY Protocol”, InternetDraft mbelshe-spdy-00, February 2012.

Non Patent Literature 3 Erik Nygren, Ramesh K. Sitaraman, Jennifer Sun, “The Akamai Network: A Platform for High-Performance Internet Applications”, ACM SIGOPS Operating Systems Review, Vol. 44, No. 3, July 2010.

SUMMARY OF INVENTION

Technical Problem

In a case where a web page to be distributed has a multi-domain configuration, and an html file thereof and at least one piece of content data are arranged in a plurality of web servers having mutually-different domains, a client, first, acquires the html file from a web server. In this html file, domains of web servers in which content data output to the web page is arranged in a distributed manner are described as link destinations. After acquisition of this html file, the client acquires each content data by accessing each of the domains and combines the content data, thereby reproducing the web page. Accordingly, unless the acquisition of the html file is completed, the client cannot proceed to the next process.

Here, in the existing TCP, while a plurality of web servers having mutually-different domains can be simultaneously connected, the number of sessions that are simultaneously established is limited. Accordingly, in a case where the number of pieces of content data configuring a web page is large, the pieces of content data cannot be simultaneously acquired. In addition, the technologies disclosed in Non-Patent Documents 1 and 3 are not compliant with so-called server push distribution in which a server initiatively distributes a content to a client, and accordingly, it is necessary for the client to access all the web servers so as to request content distribution.

On the other hand, according to the SPDY disclosed in Non-Patent Document 2, the number of sessions that are simultaneously established with servers is not limited, and, for a content stored in a web server in which the same html file as an html file requested by the client is stored, server push distribution can be performed.

However, for a content stored in a web server having a different domain, a request from the client is necessary. Accordingly, as schematically illustrated in FIG. 9, when a distribution target is a web page having a multi-domain configuration, the client not only need to acquire an html file by accessing a web server WS1 but also need to acquire other content data by accessing web servers WS1, WS2, WS3, . . . .

An object of the present invention is to solve the problems of the conventional technologies described above and provide a distribution device for a web content capable of distributing a web page having the multi-domain configuration at high speed in response to a request from a client.

Solution to Problem

In order to achieve the above-mentioned object, the distribution device according to the present invention for a web content that caches a web page having a multi-domain configuration including links to a plurality of contents having mutually-different domains in advance and distributes the web page in a substitutive manner in response to a request from a client, includes the following configuration (1) or (2):

The distribution device according to the configuration (1) includes; a main content acquiring means that acquires a main content in which a domain of a link destination of at least one sub content included in the web page is described; a sub content acquiring means that acquires each sub content by accessing each domain of said link destination; a storing means that caches said main content and said each sub content in association with each other; and a distributing means that distributes the main content and each sub content that are cached in relation with the web page requested from the client.

The distribution device according to the configuration (2) further includes; a content editing means that edits said main content and said each sub content.

Advantageous Effects of Invention

According to the configuration (1) described above, an html file of a web page having the multi-domain configuration and related content data are acquired from a plurality of web servers and are cached on a cache server in advance so as to be managed in the same domain. Accordingly, the client can simply acquire not only an html file but also the content data through server push distribution by only accessing the server.

According to the configuration (2) described above, link destination domains of sub contents described in a cached main content are rewritten into the same domain as that of the main content, and file names of sub contents that overlap each other are rewritten into different file names not overlapping each other, and accordingly, the client can reliably reproduce the web page having the multi-domain configuration in a simple manner based on the html file and the related content data that are distributed.

DESCRIPTION OF EMBODIMENTS

Figure 1:
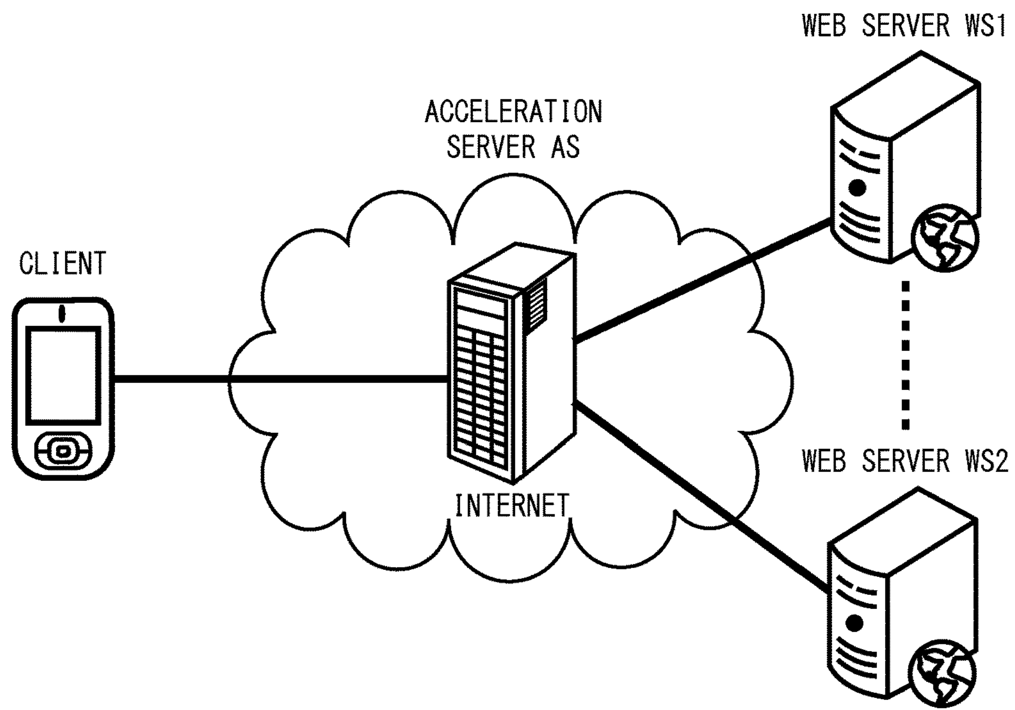
FIG. 1 is a block diagram that illustrates the network configuration of a distribution system for a web content according to an embodiment of the present invention.

Hereinafter, an embodiment of the present invention will be described in detail with reference to the drawings. FIG. 1 is a block diagram that illustrates the network configuration of a distribution system for a web content according to an embodiment of the present invention. The distribution system for a web content includes a plurality of web servers WS's in which an html file (main content) and content data (sub content) of a web page having a multi-domain configuration are arranged in a distributed manner, an acceleration server AS that fulfills a proxy server (substitutive distribution) function between each web server WS and a client, and a client that acquires the html file and each content data from the acceleration server AS and reproduces a desired web page as its major configuration. Mutually-different domains are allocated to the web servers WS's described above.

Figure 2:
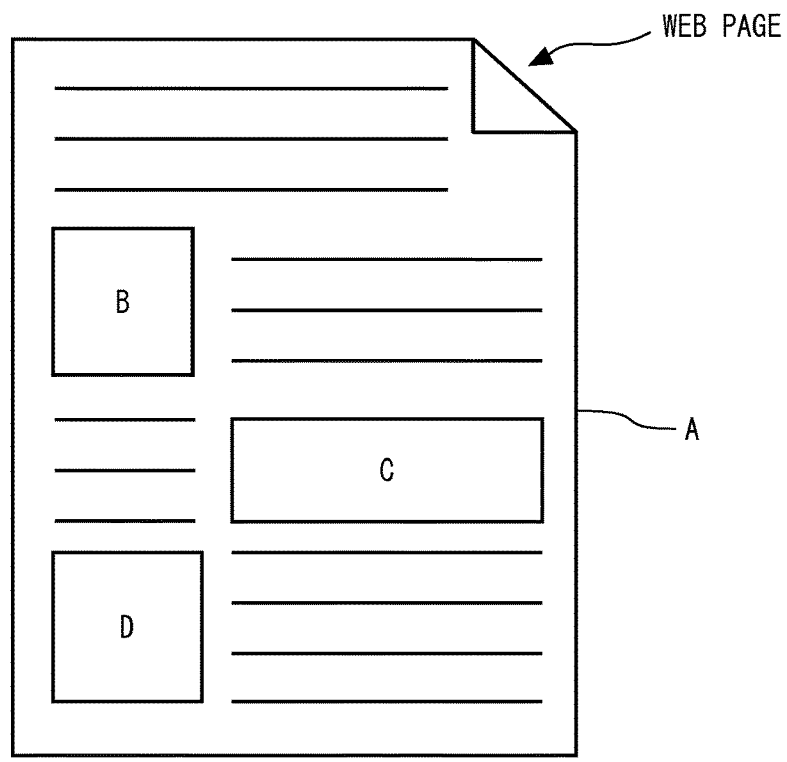
FIG. 2 is a diagram that illustrates an example of a web page having a multi-domain configuration.
Figure 3:
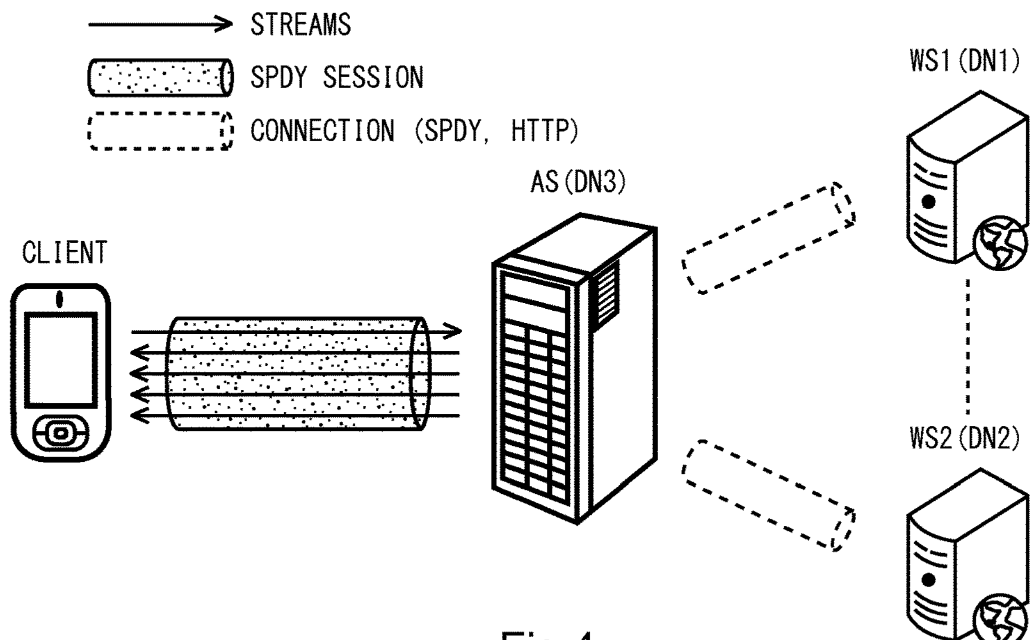
FIG. 3 is a diagram that illustrates a method of distributing content according to an embodiment of the present invention.

In this embodiment, a web page that is a distribution target, as illustrated in FIG. 2 as an example, is configured by an html file A and three pieces of content data B, C, and D output to a page of the html file A. In addition, as illustrated in FIG. 3, in this embodiment, the acceleration server AS and each web server WS are connected through an appropriate connection such as an HTTP connection or an SPDY connection, and the client and the acceleration server AS are connected through a SPDY connection capable of performing server push distribution.

The html file A and the content data B described above are stored in a web server WS1 of a domain DN1, and content data C and D are stored in a web server WS2 of a domain DN2. A domain DN3 is allocated to the acceleration server AS.

Here, first, a sequence in which the acceleration server AS caches each data of a web page from each web server WS will be described, and, next, a sequence in which the client acquires each cached data by accessing the acceleration server AS will be described.

Figure 4:
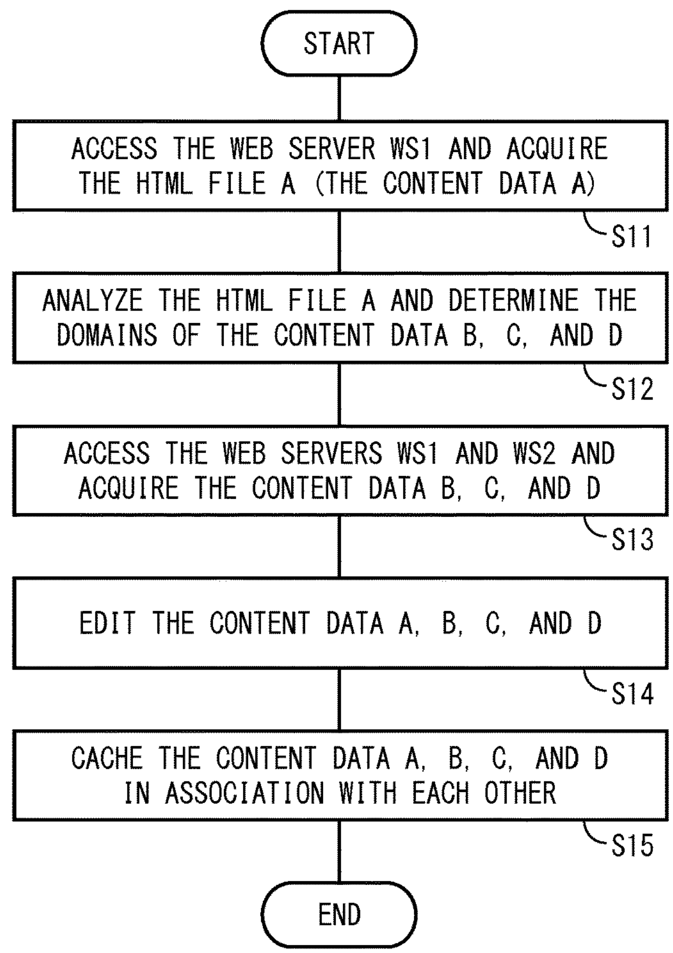
FIG. 4 is a flowchart that illustrates a method of caching a web page content that is used by an acceleration server.

FIG. 4 is a flowchart that illustrates an operation of the acceleration server AS described above for caching each data of a web page from each web server WS. In Step S11, the acceleration server AS accesses the domain DN1 of the web server WS1, thereby acquiring the content A (the html file A). In Step S12, based on link destination domains of the content data B, C, and D described in the html file described above, the domains of the content data B, C, and D are determined. Here, the domain of the content data B is determined as DN1, and the domain of the content data C and D is determined as DN2.

In Step S13, by accessing the domains DN1 and DN2, the content data B, C, and D are acquired from the web servers WS1 and WS2. In Step S14, as necessary, the html file A and the content data B, C, and D are edited.

In this embodiment, in a case where a request message for the html file A is transmitted to the domain DN1, all the link destination domains of the content data B, C, and D described in the html file A are rewritten into the domain DN1 to which the request message has been sent. In addition, in a case where the file names of the content data B, C, and D overlap each other, the file names are rewritten so as not to overlap each other. In Step S15, the html file A and the content data B, C, and D that have been acquired are cached in association with each other.

Figure 5:
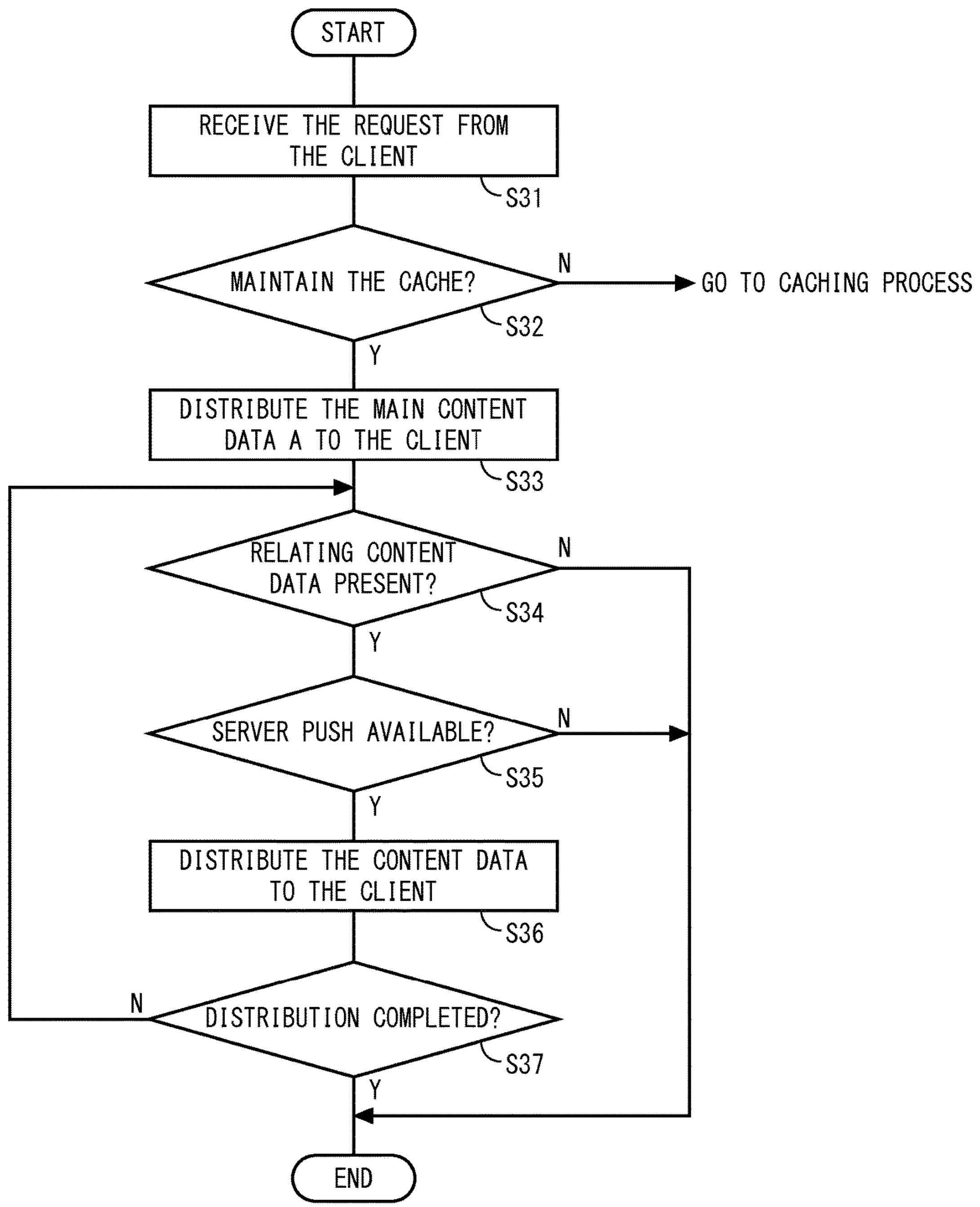
FIG. 5 is a flowchart that illustrates a method of distributing a web page that is used by the acceleration server.
Figure 6:
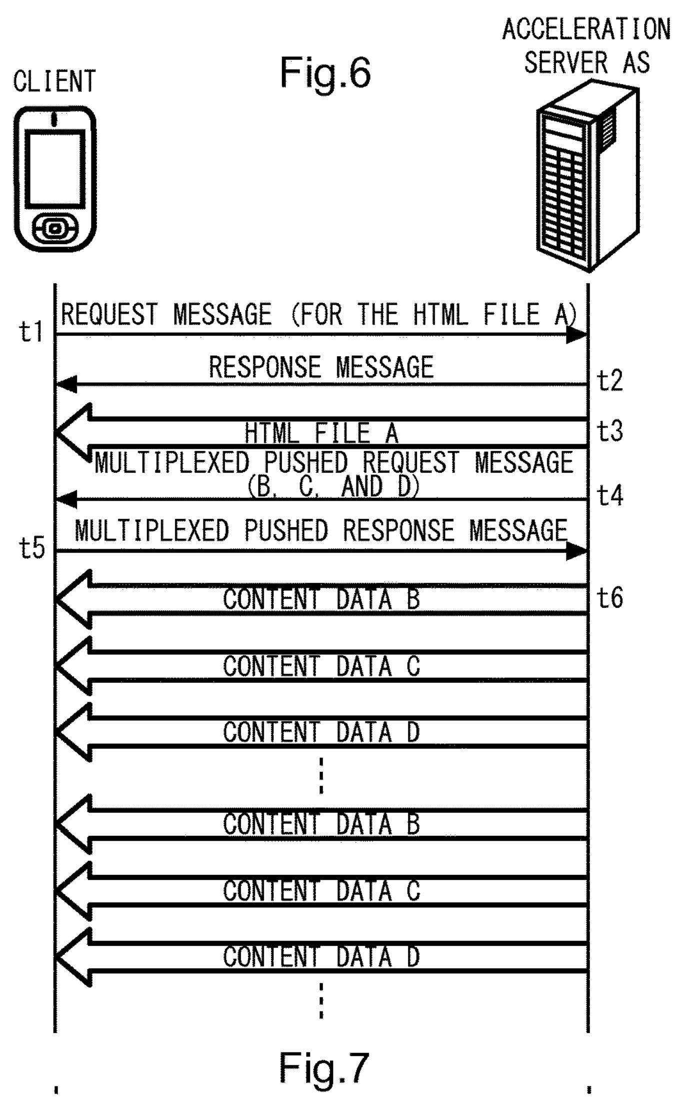
FIG. 6 is a sequence flow that illustrates a method of distributing a web page that is used by the acceleration server.

FIG. 5 is a flowchart that illustrates an operation of the acceleration server AS for distributing a web page in response to a request from a client, and FIG. 6 is a sequence flow thereof.

At time t1, when a request message for a web page (the html file A) is transmitted from the client to the acceleration server AS, in the acceleration server AS, this request message is received in Step S31, and a response message thereof is responded at time t2. In Step S32, it is determined whether or not the html file A requested as above is maintained as cached information. In a case where the html file A is maintained, the process proceeds to Step S33, and the html file A is read and is distributed to the client at time t3.

In Step S34, it is determined whether or not content data relating to the html file A described above is present. Here, since three pieces of content data B, C, and D are determined to be present, the process proceeds to Step S35. In Step S35, it is determined whether or not the content data B, C, and D described above can be distributed through server push distribution. In this embodiment, at time t4, from the acceleration server AS to the client, a multiplexed pushed request message relating to the three pieces of the content data B, C, and D is transmitted. In contrast to this, as at time t5, when a multiplexed pushed response message is responded from the client, it is determined that the server push distribution can be performed, and the process proceeds to Step S36.

In Step S36, three pieces of cached content data B, C, and D are read and are started to be distributed to the client at time t6. In Step S37, it is determined whether or not distribution of all the content data has been completed. Until the distribution is completed, the process is returned to Step S34, and distribution of relating contents is continued. Thereafter, when the distribution of all the content data is completed, the process ends.

On the other hand, in Step S32 described above, in a case where the requested web page is determined not to be cached, a caching process described with reference to FIG. 4 described above is performed, and the html file A and the content data B, C, and D which have been cached are distributed to the client.

Figure 7:
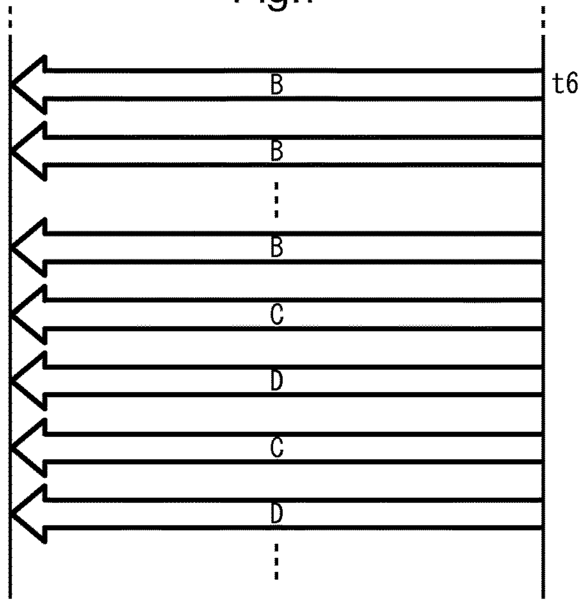
FIG. 7 is a sequence flow that illustrates another method of distributing a web page that is used by the acceleration server.

In addition, in the example described above, while three pieces of content data B, C, and D have been described to be simultaneously distributed from the acceleration server AS to the client, the present invention is not limited thereto. For example, in a case where it is known that the priority level or the degree of importance of the content data B maintained in the web server WS1 is higher than the priority level or the degree of importance of the content data C and D maintained in the web server WS2, the process may be performed as illustrated in FIG. 7. In other words, when distribution to the client is started at time t6, the content data may be configured to be distributed in order according to the priority level as in a case where, first, the content data B is distributed, and thereafter, the remaining content data C and D are distributed. Alternatively, in accordance with a congestion status of the network or the like, it may be configured such that, at the time of congestion, only the content data B having a high priority level is distributed, but the content data C and D having a low priority level are not distributed.

Figure 8:
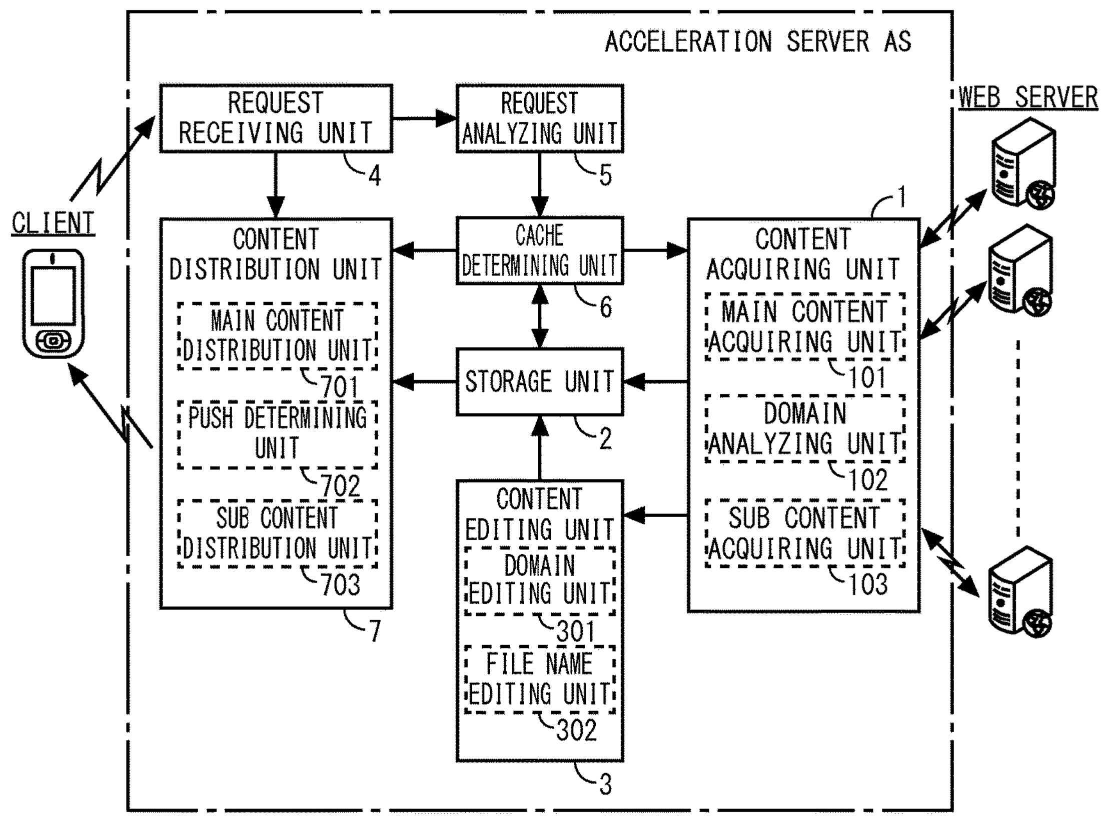
FIG. 8 is a functional block diagram of the acceleration server.
Figure 9:
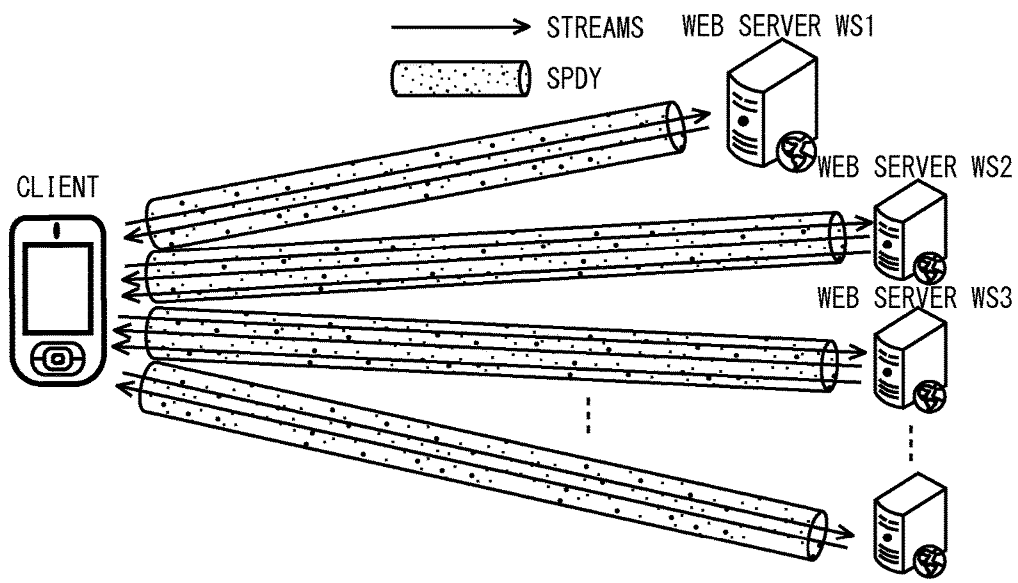
FIG. 9 is a diagram that schematically represents a method of distributing a web page according to SPDY.

FIG. 8 is a functional block diagram of the acceleration server AS. Here, configurations that are not necessary for description of the present invention are not illustrated therein.

In a content acquiring unit 1, a main content acquiring unit 101 acquires the html file A of the web page from a web server on the network. The domain of the web server is separately provided. A domain analyzing unit 102 determines the domains of sub contents based on the link destination domains of the sub contents B, C, and D described in the html file described above. A sub content acquiring unit 103 acquires the content data B, C, and D from web servers by accessing the domains described above. The html file A and the content data B, C, and D acquired as above are cached in a storage unit 2 in association with each other as a content group configuring the web page described above.

A content editing unit 3 edits the link destinations of the contents so as to enable a client to acquire the html file A and the content data B, C, and D of the web page from the same domain. In other words, a domain editing unit 301, for each sub content of which the link destination is described in the html file A acquired by the main content acquiring unit 101 described above, rewrites description of the domain of the link destination from all the original domains to the domain DN1 to which the request message has been transmitted.

A file name editing unit 302 rewrites file names of sub contents of which the file names overlap each other into different file names not overlapping each other by referring to the file names of the content data B, C, and D acquired by the sub content acquiring unit 103 described above. In the storage unit 2 described above, the html file A and the content data B, C, and D of which the domains of the link destinations and the file names have been edited are cached.

A request receiving unit 4 receives a request for distributing a web page from a client. A request analyzing unit 5 identifies the html file A and the sub contents B, C, and D that are necessary for the distribution of the web page described above. A cache determining unit 6 determines whether or not the html file A and the sub contents B, C, and D are cached in the storage unit 2 described above and, in a case where the html file and the sub contents are not cached, requests the content acquiring unit 1 to cache the html file A and the sub contents B, C, and D. In response to this request, the content acquiring unit 1 performs the caching process described above.

In a content distribution unit 7, a main content distribution unit 701 reads the html file A cached in the storage unit 2 and distributes the html file A to the client. A push determining unit 702 determines whether or not the client is compliant with the server push distribution. In a case where the client is compliant with the server push distribution, the sub content distribution unit 703 distributes the content data B, C, and D described above to the client through the server push distribution. On the other hand, in a case where the client is not compliant with the server push distribution, the sub content distribution unit 703 distributes the content data in response to a request from the client.

According to this embodiment, for a web page having the multi-domain configuration, the html file and each piece of content data are cached in advance in the acceleration server AS of the same domain. Accordingly, when a SPDY connection is established between the client and the acceleration server AS, the client can automatically acquire not only the html file but also the remaining content data through the server push distribution by only transmitting a request message requesting for an html file to the acceleration server AS. Accordingly, the web page can be distributed at a speed higher than that of a case where the client, first, acquires only the html file and identifies the domain of each piece of content data, and then acquires the remaining content data by accessing each domain, like a conventional technology.

REFERENCE SIGNS LIST

1 Content acquiring unit
2 Storage unit
3 Content editing unit
4 Request receiving unit
5 Request analyzing unit
6 Cache determining unit
7 Content distribution unit
101 Main content acquiring unit
102 Domain analyzing unit
103 Sub content acquiring unit
301 Domain editing unit
302 File name editing unit
701 Main content distribution unit
702 Push determining unit
703 Sub content distribution unit

The invention claimed is:

1. A distribution method for a web content comprising:

caching a web page having a multi-domain configuration including links to a plurality of contents having mutually-different domains in advance;

distributing the web page in a substitutive manner in response to a request from a client;

main content acquiring by acquiring a main content in which a domain of a link destination of at least one sub content included in the web page is described;

sub content acquiring by acquiring each sub content by accessing each domain of said link destination;

storing by caching said main content and said each sub content in association with each other;

content distributing by distributing the main content and each sub content that are cached in relation with the web page requested from the client; and content editing by editing said main content and said each sub content;

wherein:

said content editing rewrites the domain of the link destination for each sub content described in the main content into the same domain as the domain of the main content to thereby form rewritten sub contents; and communicating with said client using SPDY, by distributing said rewritten sub contents to the client through a server push by firstly distributing the main content cached in relation with the web page requested from the client and secondly distributing the cached rewritten sub contents corresponding to the main content by the server push without receiving the request from the client.

2. The distribution method according to claim 1, wherein said content editing includes rewriting file names of the sub contents that overlap each other into different file names not overlapping each other.

3. The distribution method according to claim 1, wherein, in a case where the main content and each sub content corresponding to the web page requested from the client is not cached, the main content and each sub content are acquired from each domain, are cached, and are distributed to said client.

4. The distribution method according to claim 1, wherein said main content is an html file, and said each sub content is content data that is output to a page of the html file.

5. The distribution method according to claim 1, wherein a priority level is set to said each sub content, and a distribution target or a distribution order according to said server push is selected in accordance with the priority level.

* * * * *